US007126146B2

(12) United States Patent
Fischer et al.

(10) Patent No.: US 7,126,146 B2
(45) Date of Patent: Oct. 24, 2006

(54) DEVICE AND METHOD FOR DETECTING THE EDGE OF A RECORDING MATERIAL

(75) Inventors: Jörg-Achim Fischer, Laboe (DE); Axel Gebhardt, Mönkenberg (DE)

(73) Assignee: Heidelberger Druckmaschinen AG, Heidelberg (DE)

( * ) Notice: Subject to any disclaimer, the term of this patent is extended or adjusted under 35 U.S.C. 154(b) by 0 days.

(21) Appl. No.: 11/399,859

(22) Filed: Apr. 7, 2006

(65) Prior Publication Data

US 2006/0175559 A1 Aug. 10, 2006

Related U.S. Application Data

(62) Division of application No. 10/701,057, filed on Nov. 4, 2003, now Pat. No. 7,057,196.

(30) Foreign Application Priority Data

Feb. 14, 2003 (DE) ................................ 103 06 104

(51) Int. Cl.
*G01V 8/00* (2006.01)
*B41F 13/12* (2006.01)

(52) U.S. Cl. ................. 250/559.36; 101/486; 347/262; 271/258.01

(58) Field of Classification Search ........... 250/559.36, 250/559.29, 559.3; 101/484–486; 347/262–264; 271/227, 258.01; 355/401
See application file for complete search history.

(56) References Cited

U.S. PATENT DOCUMENTS

| | | | |
|---|---|---|---|
| 5,220,177 A | 6/1993 | Harris | |
| 6,025,859 A * | 2/2000 | Ide et al. | 347/135 |
| 6,815,702 B1 | 11/2004 | Kiermeier et al. | |
| 6,915,743 B1 | 7/2005 | Blöhdorn et al. | |
| 2004/0231543 A1 | 11/2004 | Smythies et al. | |

FOREIGN PATENT DOCUMENTS

| | | |
|---|---|---|
| DE | 42 39 086 A1 | 5/1994 |
| DE | 42 40 804 A1 | 6/1994 |
| DE | 101 36 874 A1 | 2/2003 |
| EP | 0 015 553 A1 | 9/1988 |
| EP | 1 081 458 A2 | 3/2001 |

* cited by examiner

*Primary Examiner*—Kevin Pyo
(74) *Attorney, Agent, or Firm*—Laurence A. Greenberg; Werner H. Stemer; Ralph E. Locher

(57) ABSTRACT

A device and a method for detecting the edge of a recording material, in particular, a printing plate, in an exposer for recording printing originals includes an exposer having an exposure drum holding the plate, and an exposure head moved axially along the drum and focusing exposure beams onto the plate. An optical fiber is let into the drum surface and an illuminating device, moved axially along the drum, radiates light radially into the fiber. A photodetector at the fiber receives the light radiated therein. Covering the light radiated in with the plate is used to detect the plate edge. Counting cycles of a feed drive moving the illuminating device determines an axial position of the edge. Alternatively, light of a light source is radiated axially into the fiber and the light emitted radially by the fiber is received using an optical detector moved by the feed drive.

8 Claims, 3 Drawing Sheets

DEVICE AND METHOD FOR DETECTING THE EDGE OF A RECORDING MATERIAL

CROSS-REFERENCE TO RELATED APPLICATIONS

This is a division of application Ser. No. 10/701,057, filed Nov. 4, 2003 now U.S. Pat. No. 7,057,196; the application also claims the priority, under 35 U.S.C. §119, of German patent application DE 103 06 104.5-51, filed Feb. 14, 2003; the prior applications are herewith incorporated by reference in their entirety.

BACKGROUND OF THE INVENTION

Field of the Invention

The invention relates to the field of electronic reproduction technology and pertains to a device and a method for detecting the edge of a recording material, for example, a printing plate, in an exposer for recording printing originals.

In reproduction technology, printing originals for printed pages that contain all the elements to be printed such as texts, graphics, and images are produced. For color printing, a separate printing original is produced for each printing ink and contains all the elements that are printed in the respective color. For four-color printing, these are the printing inks cyan, magenta, yellow, and black (CMYK). The printing originals separated in accordance with printing inks are also referred to as color separations. The printing originals are generally screened and, by using an exposer, are exposed onto films, with which printing plates for printing large editions are, then, produced. Alternatively, the printing originals can also be exposed directly onto printing plates in special exposure devices, or they are transferred directly as digital data to a digital printing press. There, the printing-original data is, then, exposed onto printing plates, for example, with an exposing unit integrated into the printing press, before the printing of the edition begins immediately thereafter.

According to the current prior art, the printing originals are reproduced electronically. In such a case, the images are scanned in a color scanner and stored in the form of digital data. Texts are generated with text processing programs and graphics with drawing programs. Using a layout program, the image, text, and graphic elements are assembled to form a printed page. Following the separation into the printing inks, the printing originals are, then, present in digital form. The data formats largely used nowadays to describe the printing originals are the page description languages PostScript and portable document format (PDF). In a first step, the PostScript or PDF data is converted in a raster image processor (RIP) into color separation values for the CMYK color separations before the recording of the printing originals. In the process, for each image point, four color separation values are produced as tonal values in the value range from 0 to 100%. The color separation values are a measure of the color densities with which the four printing inks cyan, magenta, yellow, and black have to be printed on the printing material. In special cases, in which printing is carried out with more than four colors (decorative colors), each image point is described by as many color separation values as there are printing inks. The color separation values can be stored, for example, as a data value with 8 bits for each image point and printing ink, with which the value range from 0% to 100% is subdivided into 256 tonal value steps.

The data from a plurality of printed pages is assembled together with the data of further elements, such as register crosses, cut marks, and folding marks and print control fields, to form printing originals for a printed sheet. This printed sheet data is, likewise, provided as color separation values (CMYK).

Different tonal values of a color separation to be reproduced may be reproduced in the print only by surface modulation of the printing inks applied, that is to say by screening. The surface modulation of the printing inks can be carried out, for example, in accordance with a halftone method, in which the various tonal value steps of the color separation data are converted into halftone dots of different size, which are disposed in a regular pattern with periodically repeating halftone cells. During the recording of the color separations on a printing plate, the halftone dots in the individual halftone cells are assembled from exposure points that are an order of magnitude smaller than the halftone dots. A typical resolution of the exposure points is, for example, 1000 exposure points per centimeter, that is to say, an exposure point has the dimensions 10 μm×10 μm. Conversion of the color separation values into halftone dots takes place in a second step during the further processing of the color separation data in the raster image processor. As a result, the color separation data is converted into high-resolution binary values with only two lightness values (exposed or not exposed) that form the pattern of the modulated dot grid. As such, the printing original data of each color separation is described in the form of a high-resolution halftone bitmap that, for each of the exposure points on the printed area, contains a bit that indicates whether this exposure point is to be exposed or not.

In the recording devices that are used in electronic reproduction technology for the exposure of printing originals and printing forms, for example, a laser beam is produced by a laser diode, shaped by optical measures and focused on to the recording material and deflected over the recording material point by point and line by line by a deflection system. There are also recording devices that, to increase the exposure speed, produce a bundle of laser beams, for example, with a separate laser diode for each laser beam, and expose a plurality of image lines of the printing form simultaneously each time they sweep across the recording material. The printing forms can be exposed onto the film material so that what are referred to as color separation films are produced, which are, then, used for the production of printing plates by a photographic copying process. Instead, the printing plates themselves can also be exposed in a plate exposer or directly in a digital printing press, into which is integrated a unit for exposing plates. The recording material can be located on a drum (external drum exposer), in a cylindrical hollow (internal drum exposer), or on a flat surface (flatbed exposer).

In the case of an external drum exposer, the material to be exposed, in the form of films or printing plates, is mounted on a drum mounted such that it can rotate. While the drum rotates, an exposure head is moved axially along the drum at a relatively short distance. The exposure head focuses one or more laser beams onto the drum surface, sweeping over the drum surface in the form of a narrow helix. As such, during each drum revolution, one or more image lines are exposed onto the recording material.

In the case of an internal drum exposer, the material to be exposed is mounted on the inner surface of a partly open hollow cylinder and exposed with a laser beam that is aimed along the cylinder axis onto a deflection device that reflects the laser beam perpendicularly onto the material. The deflection device, a prism, or a mirror, rotates at high speed during operation and, at the same time, is moved in the direction of the cylinder axis so that the deflected laser beam describes circular or helical image lines on the material.

Flatbed exposers operate for the most part with a rapidly rotating polygonal mirror, whose mirror surfaces deflect the laser beam transversely over the recording material, while, at the same time, the recording material is moved at right angles to the deflection direction of the laser beam. As such, exposure is carried out image line by image line. Because, during the movement of the laser beam over the recording material, the length of the light path changes, complicated imaging optics are required that compensate for the size changes of the exposure point caused by these changes.

Regardless of the design of the exposer, the laser beams are not modulated with a continuously varying signal during the exposure of the printing originals, but are switched on and off based upon a binary image signal obtained from the halftone bitmap so that a pattern of halftone dots corresponding to the halftone bitmap is recorded.

During the exposure of the printing originals, care must be taken that the position of the exposed surface, as related to the edges of the recording material or as related to the holes punched in the leading edge, is always the same for all color separations of a printed sheet, because the color separations are, subsequently, to be printed over one another coincidentally in the press. The punched holes in the printing plates are used for correct positioning when the printing plates are clamped onto the plate cylinder in the press. The position of the exposed surface and the position of the punched holes are determined in relation to a leading edge and one or both side edges of the recording material. The always constant relationship to the leading edge is ensured, for example, by contact pins against which the leading edge of the recording material is placed as the material is clamped into the exposure device before the exposure. In the process, however, as a result of mechanical tolerances on the clamping device, lateral displacement of the recording material can occur. It is, therefore, necessary to determine the exact position of the side edges after the clamping, so that the edge positions so determined can be set into a relationship with the position of the exposure head at the start of the exposure. By an appropriate displacement of the starting point of the exposure, the lateral displacement caused during clamping can be compensated for so that the position of the exposed surface is also always constant in relation to the side edges of the recording material.

In European Patent Application 0 015 553 A1 a description is given of a device in a printer for detecting the side edge of a printing medium that is clamped onto a printing roll, in which a light beam is aimed at the printing roll and the printing medium. While the light beam is moved along the printing roll in the axial direction, the intensity of the reflected light is measured. Assuming that the surfaces of the printing roll and the printing medium have different reflective properties, the position of the edge of the printing medium can be determined.

In European Patent Application 1 081 458 A2, a description is given of a device in a printing-plate exposer for detecting the side edge of a printing plate that is clamped on an exposure drum. A laser diode feeds light into an optical fiber, which aims the light radially onto the exposure drum and the printing plate. Using a lens configuration, the light is focused onto the surface of the printing plate. Disposed beside the optical fiber that emits light is an optical fiber that picks up light and that is connected to a photodetector. Using the same lens configuration, the reflected light is focused onto the end face of the receiving optical fiber. Because of the thickness of the printing plate, a difference in height between the surface of the exposure drum and the surface of the printing plate results, and the emitted light is defocused when it strikes the exposure drum. As a result, a greater amount of light is reflected into the receiving optical fiber than if the emitted light strikes the printing plate. Because of the difference in the amount of reflected light, the position of the edge of the plate can be detected if the configuration is moved axially along the exposure drum. Because the detection is based on the difference in height, the edge is also detected when the surfaces of the exposure drum and printing plate have the same reflective properties.

U.S. Pat. No. 5,220,177 A to Harris describes a device for detecting the edges of a strip-like, opaque, or semitransparent material. Disposed underneath the material is an array of light-emitting diodes (LED), which projects beyond the strip material on both sides. The LEDs have a spacing of about 2.5 mm from one another. A photodetector is disposed above the material. The LEDs are switched on one after another, the light from the LEDs that are located in the vicinity of one edge being partly or wholly covered by the strip material. As a result, the signal in the photodetector is attenuated more the closer the LED is to the edge. Following filtering and smoothing of the attenuation curve, the position of the edge can be determined more accurately than corresponds to the spacing of the LEDs.

The conventional devices for detecting the edge of a recording material require a complicated optical and mechanical configuration. In the case of some devices, it is also disadvantageous that light is aimed onto the recording material to evaluate the reflected light. As a result, light-sensitive material can be exposed in a disruptive manner, even if, as a precaution, use were made of sensor light whose wavelength lies outside the spectral sensitivity range of the recording material.

SUMMARY OF THE INVENTION

It is accordingly an object of the invention to provide a device and method for detecting the edge of a recording material that overcome the hereinafore-mentioned disadvantages of the heretofore-known devices and methods of this general type and that provide a simple and inexpensive device and method for detecting the edge of a recording material that can be used advantageously during the recording of printing originals.

In the following text, the device and the method will be explained using the example of an external drum exposer for printing plates. However, in principle, the device and the method can, likewise, be applied to internal drum exposers or flatbed exposers and also to other recording materials, it merely being necessary for details of the constructional implementation to be adapted.

With the foregoing and other objects in view, there is provided, in accordance with the invention, a device for detecting an edge of a recording material in an exposer for recording printing originals, including an exposure drum having a surface for holding the recording material at the surface, an exposure head axially displaceable along the exposure drum and focusing exposure beams onto the recording material, an optical fiber disposed at the surface of the exposure drum, the optical fiber having at least one end, an illuminating device radiating light radially into the optical fiber, and a photodetector disposed at the end of the optical fiber, the photodetector receiving light radiated into the optical fiber.

With the objects of the invention in view, there is also provided a device for detecting the edge of a recording material in an exposer for recording printing originals, including a light source disposed at the end of the optical fiber and radiating light axially into the optical fiber and an optical detector receiving light emitted radially by the optical fiber.

With the objects of the invention in view, there is also provided a device for detecting the edge of a recording material in an exposer for recording printing originals, including a luminous strip disposed at the surface of the exposure drum and an optical detector receiving light emitted radially by the luminous strip.

In accordance with another feature of the invention, the optical fiber is embedded in the surface of the exposure drum.

In accordance with a further feature of the invention, the recording material is a printing plate and the exposer is an external drum exposer.

In accordance with an added feature of the invention, the photodetector detects an edge of the recording material by detecting the recording material covering the light being radiated into the optical fiber.

In accordance with an additional feature of the invention, the optical detector detects an edge of the recording material by detecting the recording material covering the light being emitted from the optical fiber.

In accordance with yet another feature of the invention, the illuminating device and the exposure head are connected fixedly to one another.

In accordance with yet a further feature of the invention, the optical detector and the exposure head are connected fixedly to one another.

In accordance with yet an added feature of the invention, the optical fiber is a fluorescent optical fiber.

In accordance with yet an additional feature of the invention, one of the exposure beams is an illuminating beam and the illuminating device is the illuminating beam radiating light into the optical fiber.

In accordance with again another feature of the invention, the illuminating device is an illuminating beam radiating light into the optical fiber.

In accordance with again a further feature of the invention, there is provided a modulator disposed between the illuminating device and the optical fiber and modulating the light radiated into the optical fiber.

In accordance with again an added feature of the invention, there is provided a modulator disposed between the optical fiber and the light source and modulating the light radiated into the optical fiber.

In accordance with again an additional feature of the invention, the luminous strip has organic light-emitting diodes.

In accordance with still another feature of the invention, the luminous strip has luminous nanostructures.

With the objects of the invention in view, there is also provided a method for detecting an edge of a recording material, in particular, a printing plate, in an exposer, in particular, external drum exposer, for recording printing originals, including the steps of holding the recording material at an exposure drum, providing an axially displaceable exposure head at the exposure drum, the exposure head focusing exposure beams onto the recording material, disposing an optical fiber at a surface of the exposure drum, fitting a photodetector at an end of the optical fiber, radially radiating light from an illuminating device into the optical fiber, and detecting an edge of the recording material by receiving light radiated into the optical fiber with a photodetector.

With the objects of the invention in view, there is also provided a method for detecting an edge of a recording material in an exposer for recording printing originals, including the steps of axially radiating light from a light source into the optical fiber, and detecting an edge of the recording material by receiving, with an optical detector, the light radially emitted by the optical fiber.

With the objects of the invention in view, there is also provided a method for detecting an edge of a recording material held at an exposure drum in an exposer for recording printing originals, an exposure head focusing exposure beams onto the recording material, including the steps of disposing an optical fiber at a surface of the exposure drum, fitting a photodetector at an end of the optical fiber, radially radiating light from an illuminating device into the optical fiber, and detecting an edge of the recording material by receiving light radiated into the optical fiber with a photodetector.

With the objects of the invention in view, there is also provided a method for detecting an edge of a recording material held at an exposure drum in an exposer for recording printing originals, an exposure head focusing exposure beams onto the recording material, including the steps of axially radiating light from a light source into the optical fiber and detecting an edge of the recording material by receiving, with an optical detector, the light radially emitted by the optical fiber.

In accordance with still a further mode of the invention, the illuminating device is moved axially along the exposure drum with a feed drive.

In accordance with still an added mode of the invention, the cycles of the feed drive are counted to determine an axial position of the edge of the recording material.

In accordance with still an additional mode of the invention, the optical detector is moved axially along the exposure drum with a feed drive.

In accordance with a concomitant mode of the invention, the cycles of the feed drive are counted to determine an axial position of the edge of the recording material.

Other features that are considered as characteristic for the invention are set forth in the appended claims.

Although the invention is illustrated and described herein as embodied in a device and method for detecting the edge of a recording material, it is, nevertheless, not intended to be limited to the details shown because various modifications and structural changes may be made therein without departing from the spirit of the invention and within the scope and range of equivalents of the claims.

The construction and method of operation of the invention, however, together with additional objects and advantages thereof, will be best understood from the following description of specific embodiments when read in connection with the accompanying drawings.

DESCRIPTION OF THE PREFERRED EMBODIMENTS

Figure 1:
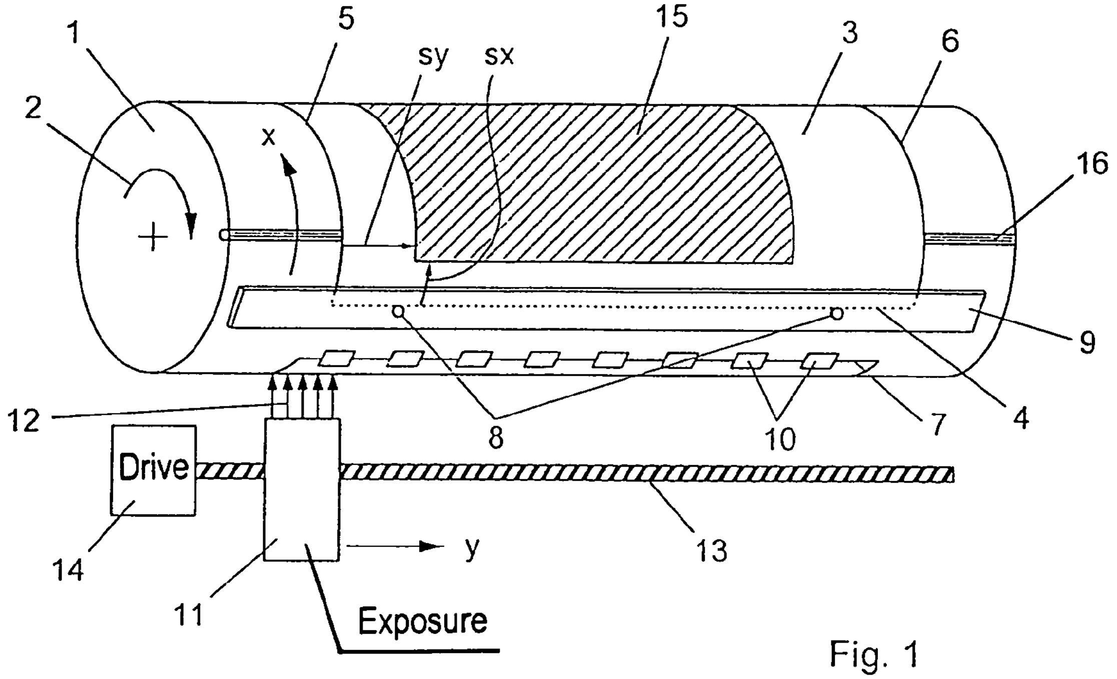
FIG. 1 is a partially perspective and partially plan view of an external drum exposer according to the invention.

Referring now to the figures of the drawings in detail and first, particularly to FIG. 1 thereof, there is shown the basic construction of an external drum exposer. An exposure drum 1 is mounted such that it can rotate, and can be set into a uniform rotational movement in the direction of the rotation arrow 2 by a non-illustrated rotational drive. Clamped onto the exposure drum 1 is an unexposed, rectangular printing plate 3, which has a leading edge 4, a left-hand side edge 5, a right-hand side edge 6, and a trailing edge 7. The printing plate 3 is clamped on such that its leading edge 4 touches contact pins 8 that are firmly connected to the exposure drum 1 and project beyond the surface of the exposure drum 1. A clamping strip 9 presses the leading edge 4 firmly onto the surface of the exposure drum 1 as well and, as a result, fixes the leading edge 4 of the printing plate 3. The printing plate 3 is held flat on the drum surface by a non-illustrated vacuum device that attracts the printing plate 3 by suction through holes in the drum surface so that the printing plate 3 is not loosened by the centrifugal forces during the rotation. Additionally, the trailing edge 7 of the printing plate 3 is fixed by clamping pieces 10.

An exposure head 11 is moved axially along the exposure drum 1 at a relatively short distance as the exposure drum 1 rotates. The exposure head 11 focuses one or more laser beams 12 onto the drum surface, which sweep over the drum surface in the form of narrow helices. As such, during the drum revolution, one or more image lines are exposed onto the recording material in the circumferential direction x. The exposure head 11 is moved in the feed direction y by a feed spindle 13, to which it is connected by a form fit and that is set moving rotationally by a feed drive 14. The feed drive 14 is, preferably, constructed with a stepping motor. By counting the stepping motor cycles, starting from a known reference position, the current axial y position of the exposure head 11 can be determined very accurately. Alternatively, a rotary encoder not illustrated in FIG. 1 can be fitted to the rotational shaft of the feed drive 14 and, after a specific rotational angle increment of the feed spindle 13, generates a cycle signal in each case. By counting these cycles, the y position of the exposure head 11 can, likewise, be determined.

The printing original 15 to be exposed on the printing plate 3 covers only part of the total recording area that is available. However, for all the color separations that are exposed one after another on different printing plates 3, the printing original 15 must always have the same position in relation to the edges of the printing plate 3 so that no register errors occur later during the overprinting of the color separations, that is to say, the distance sx of the front edge of the printing original 15 from the leading edge 4 of the printing plate 3, and the distance sy of the left-hand edge of the printing original 15 from the left-hand side edge 5 of the printing plate 3 must be the same for all the color separations.

The maintenance of the distance sx is achieved by placing the printing plate 3 on the contact pins 8 when it is clamped onto the exposure drum 1 and, starting from this known circumferential position, the starting point of the exposure for the image lines is displaced in the x direction by the distance sx. The displacement is carried out, for example, by counting circumferential cycles, which are derived from a rotary encoder not illustrated in FIG. 1 but connected to the drum axle.

In maintaining the distance sy, the problem arises that the printing plate 3 can experience a small displacement in the y direction as it is clamped onto the exposure drum 1 as a result of mechanical tolerances in the clamping device. To be able to maintain the distance sy accurately, it is, therefore, necessary to determine the precise position of the left-hand side edge 5 of the printing plate 3 after it has been clamped in. The edge position determined can, then, be set into a relationship with the position of the exposure head 11 and, by an appropriate displacement of the starting point of the exposure in the y direction, the axial displacement of the printing plate 3 caused during the clamping can be compensated for. The determination of the correct starting point for the exposure is performed by counting the cycles with which the feed drive 14 is controlled.

Figure 2:
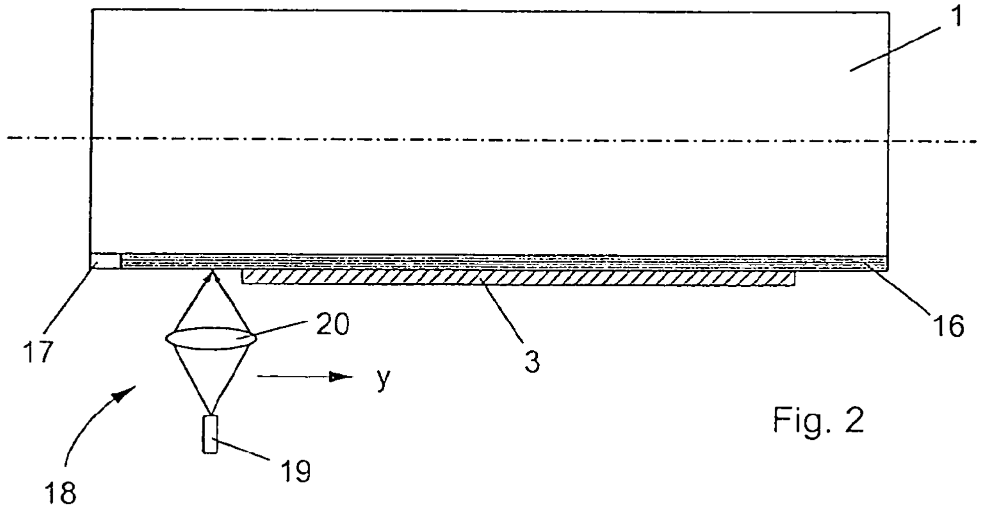
FIG. 2 is a longitudinal cross-sectional view of a first embodiment of the exposer of FIG. 1.

According to the device of the invention and for the method for determining the position of a side edge of the printing plate 3, an optical fiber 16 is provided, which is let into a suitable groove in the surface of the exposure drum 1 and extends in the axial direction of the exposure drum 1. In this regard, FIG. 2 shows a first embodiment in a longitudinal sectional view of the exposure drum 1. Fitted at one end of the optical fiber 16 is a photodetector 17 that receives light propagated in the longitudinal direction of the optical fiber 16. Using an illumination device 18 that includes a laser diode 19 and focusing optics 20, light is radiated into the optical fiber 16 with the exposure drum 1 at a standstill, while the illumination device 18 is moved axially along the exposure drum 1 in the y direction. The illumination device 18 is fitted, preferably, to the exposure head 11 and is moved in the axial direction together with the latter. The light radiated into the optical fiber 16 propagates in the longitudinal direction of the optical fiber 16 and is received by the photodetector 17. As soon as the illumination device 18 crosses the left-hand side edge 5 of the printing plate 3 during its movement in the y direction, the light radiated in is covered by the printing plate 3, and the electrical signal output by the photodetector 17 is attenuated highly. By counting the cycles of the feed drive 14, the y position at which the signal change occurs can be determined.

For the device according to the invention, use is preferably made of an optical fiber 16 that scatters the light radiated in so that the greatest possible proportion of the light is propagated in the longitudinal direction of the optical fiber 16. The light scattering in the optical fiber 16 can be assisted by roughening and making reflective the side of the optical fiber 16 that faces away from the illuminating device 18. A specifically contaminated fiber material, for example, with small air inclusions, can, likewise, contribute to increasing the light scattering. Alternatively, a fluorescent optical fiber 16 can also be used that, by introduced dyestuffs, converts the light radiated in into scattered light of a different wavelength. The wavelength and/or intensity of the light output by the laser diode 19 must be chosen such that the printing plate 3 is not pre-exposed. If the optical sensitivity of printing plate is low, or the printing plate 3 has a pronounced exposure threshold, that is to say, it is exposed only by light above a specific intensity, one of the laser beams 12 with an appropriately attenuated intensity can, alternatively, be used instead of the illuminating device 18. To improve the signal-to-noise ratio of the signal generated by the photodetector 17, it is advantageous to modulate the light from the laser diode 19, for example, with a high-frequency square-wave signal.

Figure 3:
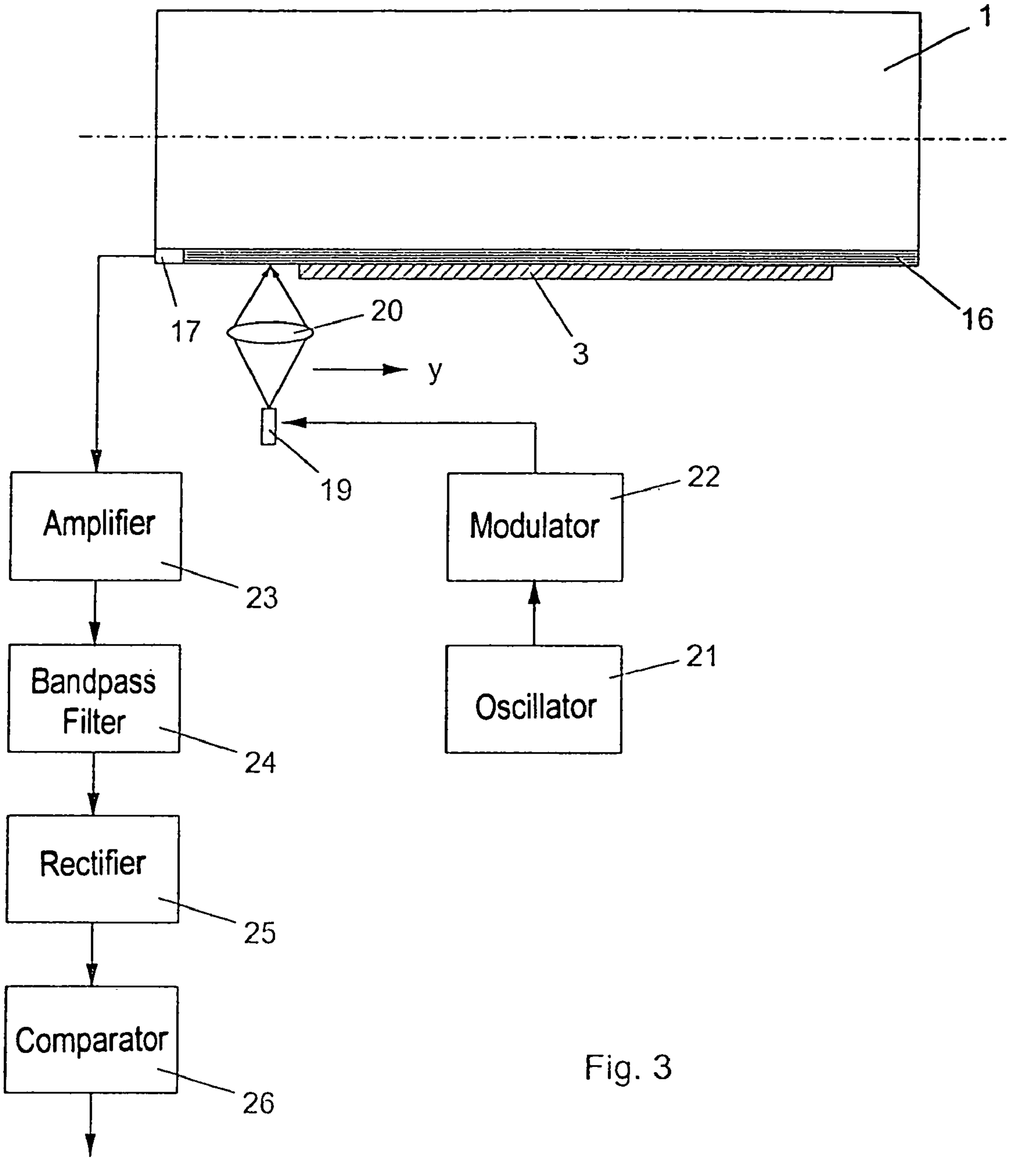
FIG. 3 is a longitudinal cross-sectional view of the first embodiment of the exposer of FIG. 1 with a block circuit diagram of a measured light signal processing device according to the invention.

FIG. 3 shows the signal processing for the modulation and demodulation as a block diagram. Using an oscillator 21, a high-frequency signal is generated that is modulated onto the light from the laser diode 19 by a modulator 22. An amplifier 23 amplifies the electrical signal output by the photodetector 17. Using a bandpass filter 24, the modulation signal is filtered out and, using a rectifier 25, it is converted into a DC voltage. Then, using a comparator 26, it is determined whether the DC voltage exceeds a threshold or not. Thus, a two-value signal is obtained, the level change signaling the action of passing over an edge of the printing plate 3.

Figure 4:
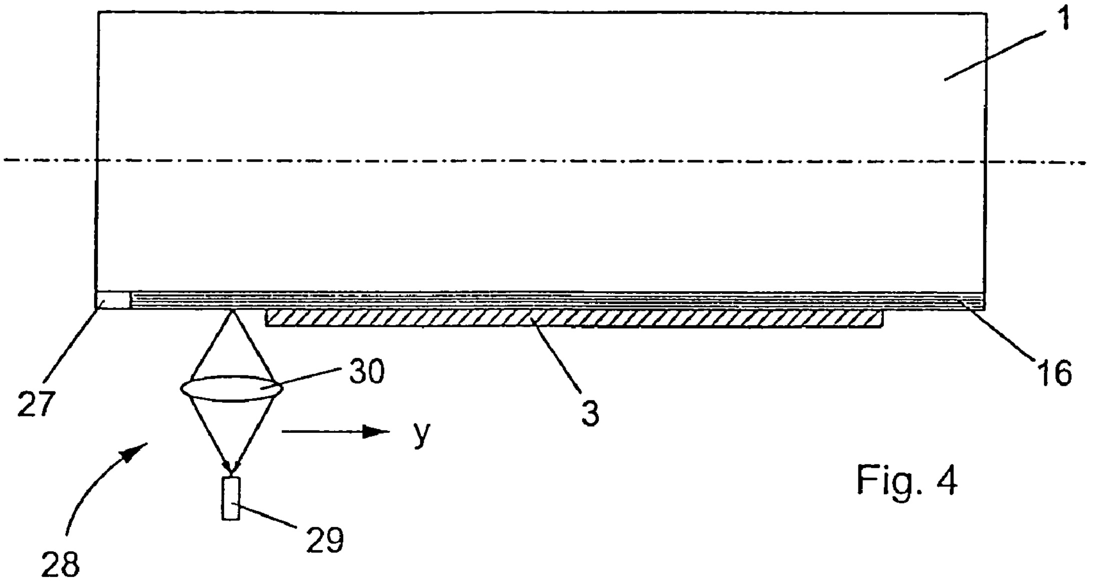
FIG. 4 is a longitudinal cross-sectional view of a second embodiment of the exposer of FIG. 1.

FIG. 4 shows a further embodiment of the device according to the invention. Instead of the photodetector, at one end of the optical fiber 16 there is a laser diode 27 or a light-emitting diode (LED), which radiates light into the optical fiber 16, which light is propagated in the longitudinal direction of the optical fiber 16. The light radiated in is scattered in the optical fiber 16 or, in the case of a fluorescent optical fiber, is converted into scattered light of another wavelength. The scattered light is emitted radially through the outer surface of the optical fiber 16 so that the optical fiber lights up. The light emitted is intercepted by an optical detector 28, which includes a photodetector 29 and focusing optics 30, and converted into an electrical signal. The optical detector 28 is fitted to the exposure head 11 and is moved axially along the exposure drum 1 in the y direction with the exposure drum 1 at a standstill. As soon as the optical detector 28 crosses the left-hand side edge 5 of the printing plate 3 during its movement in the y direction, the light emitted is covered by the printing plate 3, and the electrical signal output by the photodetector 29 is attenuated highly. In such a configuration, too, the signal-to-noise ratio of the optical detector signal can be improved by modulation of the light radiated in.

In the embodiment according to FIG. 4, the optical fiber 16 could also be replaced by organic light-emitting diodes (OLED) in the form of one or more long strips. In an OLED, organic dyestuff molecules that are embedded in a polymer material are excited by a current flow to emit light as a result of what is referred to as electroluminescence. The laser diodes 27 can, then, be dispensed with because the OLED strip, itself, lights up. A further possible variant is the use of a luminous nanostructure in the form of a long strip instead of the optical fiber 16. A luminous nanostructure is produced by lateral npn or pnp junctions being produced in a pre-doped silicon substrate with the aid of a focused ion beam. In the breakdown mode of the semiconductor junctions, the structure written in with the ion beam lights up. For the present application here, a luminous linear structure could be produced.

In both the embodiments of the invention (according to FIGS. 2 and 4), it would be sufficient to use a relatively short optical fiber 16 that extends only over the axial region of the exposure drum 1 in which the position of the left-hand side edge 5 is to be expected for the different formats of the printing plates 3 to be exposed. If the optical fiber 16 extends over both the side edges of the printing plate 3 or if, in each case, a separate optical fiber 16 is provided in the region of both the left-hand and the right-hand side edges, in addition, the position of the right-hand side edge 6 of the printing plate 3, and, therefore, also the width of the printing plate 3, can be determined. In all the embodiments, the device according to the invention and the method for its application have the advantage that the measurement of the position of the side edge is based on the measurement light being covered by the printing plate 3 so that, in the second embodiment according to FIG. 4, the reflection or absorption of the printing plate 3 for the measurement light plays no part. In the first embodiment according to FIG. 2, with respect to the absorption, it is merely necessary to take care that the printing plate 3 is not pre-exposed by the measurement light.

We claim:

1. A device for detecting the edge of a recording material in an exposer for recording printing originals, comprising:

an exposure drum having a surface for holding the recording material at said surface;

an exposure head axially displaceable along said exposure drum and focusing exposure beams onto the recording material;

a luminous strip disposed at said surface of said exposure drum; and an optical detector receiving light emitted radially by said luminous strip.

2. The device according to claim 1, wherein said luminous strip is embedded in said surface of said exposure drum.

3. The device according to claim 1, wherein the recording material is a printing plate and the exposer is an external drum exposer.

4. The device according to claim 1, wherein said luminous strip has organic light-emitting diodes.

5. The device according to claim 1, wherein said luminous strip is formed of organic light-emitting diodes.

6. The device according to claim 1, wherein said luminous strip has luminous nanostructures.

7. The device according to claim 1, wherein said luminous strip is formed of luminous nanostructures.

8. A device for detecting the edge of a printing plate in an external drum exposer for recording printing originals, comprising:

an exposure drum having a surface for holding the printing plate at said surface;

an exposure head axially displaceable along said exposure drum and focusing exposure beams onto the printing plate;

a luminous strip disposed at said surface of said exposure drum; and an optical detector receiving light emitted radially by said luminous strip.

* * * * *